Aug. 15, 1961 C. E. BLEIL 2,996,418

METHOD AND APPARATUS FOR VAPOR DEPOSITING THIN FILMS

Filed June 5, 1957

INVENTOR.
Carl E. Bleil
BY
S. E. Ross
ATTORNEY

United States Patent Office 2,996,418

Patented Aug. 15, 1961

2,996,418

METHOD AND APPARATUS FOR VAPOR DEPOSITING THIN FILMS

Carl E. Bleil, Clawson, Mich., assignor to General Motors Corporation, Detroit, Mich., a corporation of Delaware Filed June 5, 1957, Ser. No. 663,644
10 Claims. (Cl. 154—95)

This invention relates to thin films of materials and the formation of same. More particularly, this invention relates to thin films which can be used, for example, as magnetic storage elements in modern electronic computer devices and to an improved method and apparatus for the manufacture of such films.

In modern computing apparatus, the storage of information in the computer is accomplished by magnetic cells which can be in the form of thin films of magnetizable material. The preferred materials for such cells are the magnetizable metal oxides, particularly the mixed oxides of iron and bivalent metals such as nickel. To raise the information storage capacity of the computer and thereby increase its utility, it is advantageous to increase the number of storage cells and therefore to decrease their size or thickness. Thin films function very effectively as storage cells; however, until now, it has not been possible to produce thin films of mixed oxides having the desired magnetic properties such as are required. The metal oxides as a class and more specifically the magnetizable mixed oxides have very high vaporization temperatures and, therefore, cannot conveniently or practically be vaporized as such to form thin films in accordance with techniques which are conventionally used to produce, for example, pure metal films.

It is one of the objects of this invention to provide a thin film of a composition which by its nature has a high vaporization temperature. Another object of this invention is to provide a process whereby thin films of such a composition may be formed. Still another object of this invention is to provide an apparatus to produce such films in a practical and convenient manner.

More specifically, an object of the invention is the provision of a device useful as a memory cell in computers comprising a thin film of magnetizable metal oxide and an improved method and apparatus for making same.

Briefly, in accordance with the invention, a thin film of metal oxide is formed by the evaporation of metal under reduced pressure in a closed chamber, oxygen gas being introduced into the chamber to combine with the vaporized metal to form the oxide which condenses as a thin film on a substrate member within the chamber. The metal is shielded from the gas prior to its evaporation to prevent premature oxide formation. Where, as in the preferred embodiment, the metal is evaporated as an alloy or as a mixture of metals, the shielding means additionally serves the important function of preventing differential vaporization of the metals thereby assuring that the alloy or the mixture of metals vaporizes as such to combine with the oxygen gas and form a homogeneous true mixed oxide.

Figure 1:
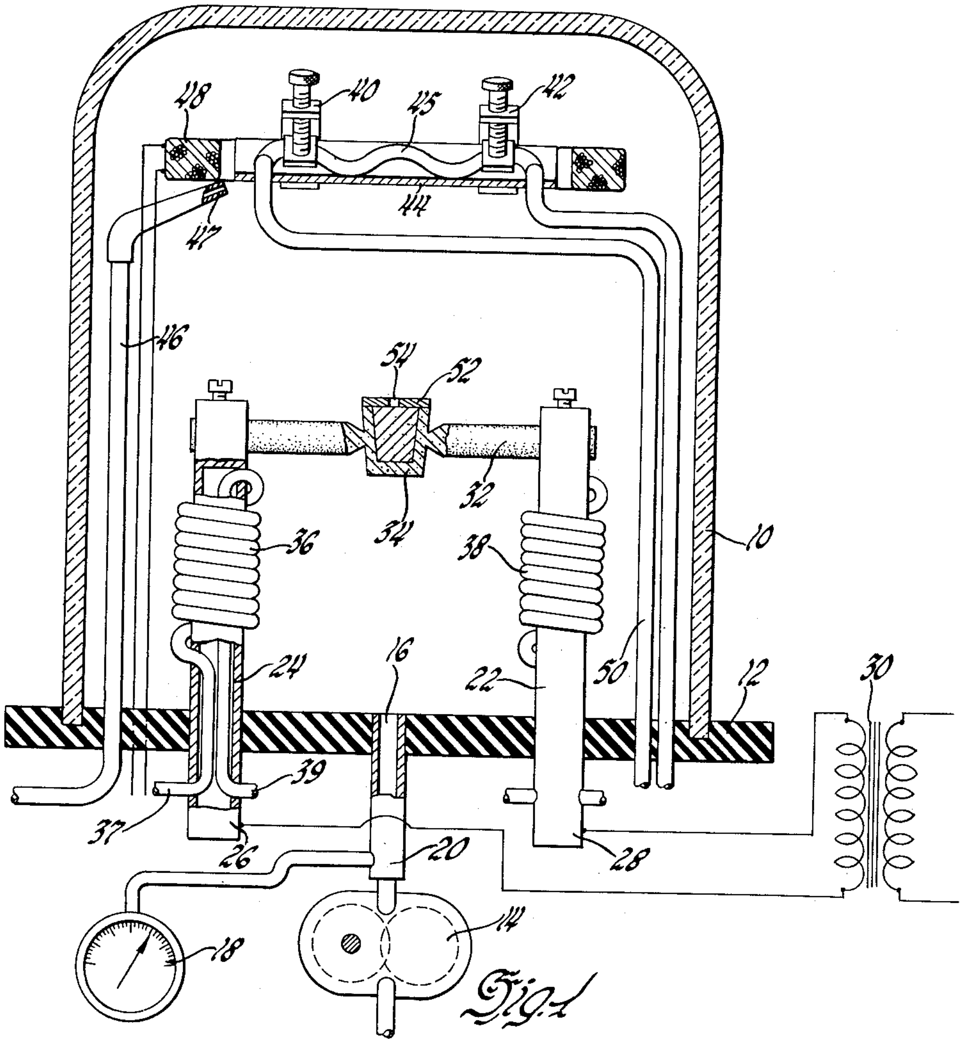
Figure 2:
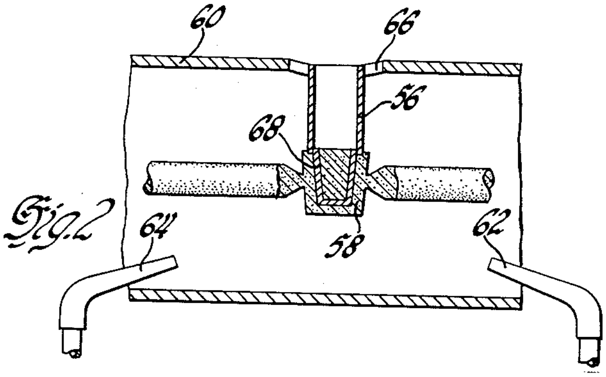

Other objects, advantages and features of the invention will appear more clearly from the following description of a preferred embodiment thereof and from the drawings, in which:

FIGURE 1 shows a side view in partial section of apparatus comprehended by the invention; and FIGURE 2 shows a similar view of a modification of the shielding means which is a part of the apparatus shown in FIGURE 1.

Referring now to the drawings, in FIGURE 1, a bell-jar member 10 which may be of glass, ceramic or other suitable material is positioned over and sealed to a base plate 12, made of insulating material or any other suitable material which is isolated from all electrical leads, to thereby form a hermetically sealed chamber. A vacuum pump 14 connected to the chamber through the opening 16 in the base plate provides means to evacuate the chamber, a suitable gauge 18 being connected in the vacuum line 20 to indicate the degree of evacuation. Hollow copper rods 22 and 24 connected at their lower extremities 26 and 28 to a transformer 30 extend upwardly through the base plate into the chamber. A horizontal rod 32 made of a resistance material and shaped with a recess which forms a crucible 34 at its center portion is connected by threaded members at its ends to copper rods 22 and 24. The preferred material for the rod 32 and therefore the crucible 34 is carbon although other resistance materials may be used if desired. The horizontal rod 32 is shaped in such a manner that the crucible portion thereof presents the smallest cross-sectional area of the rod and therefore the greatest resistance to the passage of current. By shaping the rod in this manner, the heat produced is concentrated in the crucible area. Cooling coils 36 and 38 around the tubes 22 and 24, respectively, are for the purpose of maintaining the rods cool during the resistance heating of the crucible 34. As shown in detail in connection with coil 36, both the entrance conduit 37 and exit conduit 39 for the cooling liquid which is passed through the coil can conveniently be located inside the respective rods 22 and 24.

Adjacent the top of the chamber directly over and spaced from the crucible 34 is a support in the form of a pair of screw clamps 40 and 42 for the substrate 44 which is thereby positioned to receive the oxide film to be formed. In general, any substrate material having the required smoothness and a coefficient of expansion the same as, or generally similar to, the film to be deposited may be used. Materials which are particularly suitable for use as the substrate for the deposition of nickel iron oxide films, are, for example, Pyrex glass, soft glass, iron, copper and mica. The support clamps are secured to a tube 50 of copper or the like which extends from a reservoir (not shown) of temperature-regulating liquid, up through the base plate 12, across the back face of the substrate 44, and back to the liquid reservoir. Thus, the tube 50 serves not only as a part of the support means but also as a temperature control means for the substrate and, in connection with the latter function, it will be observed that the portion 45 of the tube which abuts the substrate is wave-shaped to thereby provide greater heat transfer surface area.

If desired, a magnet or electrical coil 48 can be positioned around the substrate to regulate crystal orientation during the film formation.

A conduit 46 connected to a gas supply (not shown) extends through the base plate 12 into the chamber, its exit 47 being located adjacent the substrate to provide a fairly concentrated layer of the gas adjacent the surface of the substrate.

A cover 52 on the crucible has an aperture 54 therein to permit diffusion of the volatilized metals. The cover 52 serves to effectively shield the contents of the crucible from contact with the gaseous medium before volatilization and diffusion through the aperture 54. Additionally, the cover effectively closes the crucible so that substantially all of the crucible contents are in the vapor state prior to diffusion of the vapors into the chamber.

FIGURE 2 shows another embodiment of a suitable shielding means which may be employed both to protect the crucible contents from the gaseous medium prior to evaporation and to permit substantially complete vaporization of the crucible contents before diffusion takes place. A short vertical tube 56 is positioned around the mouth of the crucible 58, this tube serving a purpose analogous to that of the cover 52, shown in FIGURE 1. An additional shielding means, a generally cylindrical member 60 is horizontally disposed around the furnace having the gas jets 62 and 64, which are connected to a suitable supply of inert gas (not shown), disposed therein. This cylindrical member 60 has an aperture of somewhat greater diameter than tube 56 into which the tube projects so as to provide a narrow annular opening as shown at 66. Inert gas introduced into the cylindrical member 60 by the gas jets 62 and 64 escapes from the cylinder through the annular opening 66 and accumulates around the mouth of the tube 56. Entrance of the reaction gas from the chamber into the crucible is thereby further inhibited.

Depending upon the temperatures used and the nature of the materials to be evaporated, it is sometimes desirable to utilize a lining of some suitable refractory material in the crucible. Thus, crucible 58 shown in FIGURE 2 has a lining 68 which can be of alumina, tungsten carbide or the like. Any material having the high-temperature stability and chemical inertness with respect to the material being heated can be used as a crucible lining. It is understood that the crucible shown in FIGURE 1 may also be adapted with a suitable lining material serving the above-mentioned purpose.

The following description of an embodiment of the method of this invention will serve to illustrate the operation of the apparatus: A mixture of two parts iron and one part nickel by weight in the form of iron wire and nickel wire is placed in the crucible and the crucible cover 52 fitted over the crucible, as shown. It may be noted that the metals to be evaporated can be supplied in various forms other than iron wire and nickel wire, for example, an iron-nickel alloy wire, and small fragments of an iron-nickel alloy or iron and nickel respectively. The chamber is then evacuated to a pressure of about 0.00001 millimeter of mercury by means of pump 14 and the crucible is resistance heated to approximately 2100° C. by passing current through the rod 32. At the same time, coolant is circulated through and around the supporting copper rods 22 and 24 to protect them against overheating.

Heat radiating from the furnace can also be detrimental to the formation of an extremely thin homogeneous metal oxide film by causing fusion of the film to the substrate surface which not only contaminates the thin film but effects a permanent adherance of the film to the substrate. To prevent such detrimental effects due to heating of the substrate, it is advantageous to cool the substrate to below 100° C. by providing a flow of a coolant through the substrate support tube during the heating period.

At least prior to the time diffusion of metal from the crucible begins, oxygen gas is introduced into the chamber by means of the orifice 47 to obtain an oxygen pressure of approximately 10 microns of mercury. The metal from the crucible diffuses into the chamber, rises, and interacts with the oxygen gas to form the oxide which condenses out as a thin film on the substrate. At the oxygen pressure specified above, a film of the mixed oxide $NiFe_2O_4$ is formed.

Ideally, it is desirable to have a thin layer of the reaction gas immediately adjacent the surface of the substrate material such that oxidation reaction takes place in situ with no interaction taking place before the metal reaches, or substantially reaches, the substrate. Thus, it is advantageous to produce an oxygen gradient in the chamber by introducing the oxygen into the upper region of the chamber and evacuating in the lower regions as by the preferred apparatus shown. Another advantage in having such an oxygen gradient is that the oxygen concentration adjacent the crucible is thereby maintained low to prevent oxidization of the metal in the crucible prior to diffusion. If desired, the gradient may be substantially increased by introducing an inert gas simultaneously in the lower part of the chamber as the oxygen is introduced in the upper part. This may be conveniently accomplished by providing an inlet for the inert gas adjacent the lower end of the chamber or, preferably, by use of the apparatus shown in FIGURE 2 as heretofore described. Another means which can be employed to aid in concentrating the oxygen gas into a thin layer adjacent the substrate surface is by ionizing the gas and polarizing the substrate material in order to attract the gaseous ions to the substrate surface.

For some uses, it may be desirable to obtain a magnetized film and to this end, the film may be subjected to a magnetic field during its deposition so as to properly orient the oxide molecules. This can be conveniently accomplished, as indicated previously, by placing magnetic or electrical coils in the chamber adjacent the substrate.

The method of this invention permits the successful deposition of thin films of mixed oxides, ranging in thickness from a few angstroms to several thousandths of an inch.

As stated previously, it is best to use a substrate material for the deposition which has a coefficient of expansion the same as, or generally similar to, that of the film being deposited. In some instances it may occur that the substrate best suited for use of a film as, say a memory cell in a computer, is of a different material than that best suited for deposition of the film. This necessitates removal of the film from the substrate on which deposited and transferral to the substrate best suited for its use. As noted previously, cooling of the substrate during deposition of the film inhibits permanent adherance thereto; however, to insure removal of the film easily without damage, it is desirable to coat the substrate prior to deposition of the film with a thin parting layer such as a suitable wetting agent. A substance functioning suitably as a parting layer is the wetting agent sodium octyl phosphate, such as Victawet 35B, obtainable from the Victor Chemical Works of Chicago, Illinois, which is a mixture of about 71% to 73% sodium octyl orthophosphates, pyrophosphates and tripolyphosphates and about 27% to 29% water. The general formula of $Na_2R_2P_2O_5.H_2O$ where R is a 2-ethyl hexyl group characterizes this substance.

The wetting agent can be applied to the substrate as an aqueous solution which is allowed to dry. Then, after deposition of the film and cooling, the film-coated substrate is immersed for a short time in water thereby allowing the film to easily be separated from the substrate. Since the oxides of the film are relatively insoluble in water, the short period of contact therewith is not detrimental. Once removed from the substrate on which it was deposited, the film can then be transferred and suitably secured to another substrate material better suited for utilization of the film.

Although the present invention has been described in conjunction with certain preferred embodiments, variations and modifications may be found therein as those skilled in the art may understand, as for example, induction heating may be used in place of resistance heating and a plurality of furnaces may be used instead of just one furnace to evaporate metals of varied melting points.

I claim:

1. A method for the production of thin films which comprises the following steps, supporting a metal to be evaporated in a chamber, providing a suitable substrate material in said chamber, evacuating said chamber, forming in said chamber a controlled low pressure atmosphere into which said metal evaporates, said atmosphere being chemically reactive with the vapor of said metal, evaporating said metal to form a vapor which diffuses into said atmosphere, regulating contact of said atmosphere and said vapor to promote intermixture thereof subsequent to almost complete evaporation of said metal, and condensing reaction products of the vapor and the atmosphere on said suitable substrate material.

2. The method as set forth in claim 1 in which orientation of the molecules of the film is provided by subjecting the substrate to a magnetic field during deposition of the film.

3. A method for the making of thin films by evaporation which comprises the following steps: supporting a metal to be evaporated in a chamber, providing a suitable substrate material in said chamber spaced from said metal to be evaporated, evacuating said chamber, heating said metal to form a vapor, thereafter introducing a gas which is chemically reactive with said vapor into said chamber to provide a low-pressure gaseous medium into which said vapor diffuses, regulating contact of said vapor and said gas to promote intermixture thereof subsequent to almost complete evaporation of said metal, and condensing the reaction products of said gas and said vaporized metal on said substrate material.

4. A method for the making of thin films of metal oxides by evaporation comprising the following steps: supporting a metal to be evaporated in a crucible, placing said crucible in a chamber, providing a suitable substrate material in said chamber spaced above said crucible, evacuating said chamber, heating said metal, thereafter introducing oxygen gas into a region of said chamber spaced from said metal and adjacent said substrate material to provide an oxygen atmosphere into which said metal evaporates, shielding said metal to substantially inhibit contact and interaction with said oxygen before almost complete evaporation of said metal, evaporating said metal through an aperture in said shielding means into said oxygen atmosphere, and condensing the resulting reaction products of the vaporized metal and the gas as a metal oxide film on a suitable substrate material.

5. The method of claim 4 wherein the substrate material prior to deposition of the film is coated with a wetting agent.

6. A method for the making of thin films of metal oxides by evaporation comprising the following steps: supporting a metal to be evaporated in a crucible, placing said crucible in a chamber, coating a suitable substrate material with a wetting agent, placing said substrate material in said chamber spaced above said crucible, evacuating said chamber, heating said metal, thereafter introducing oxygen gas into a region of said chamber spaced from said metal and adjacent said substrate material, shielding said metal to substantially inhibit contact and interaction with said oxygen before almost complete evaporation of said metal, evaporating said metal through an aperture in said shielding means into said oxygen atmosphere, condensing the resulting reaction products of the vaporized metal and the gas as a metal oxide film on said substrate material, removing the thus coated substrate material from said chamber, immersing said coated substrate material in water, removing said metal oxide film from said substrate material, transferring said metal oxide film to a second substrate material better suited for use of said film, and securing said film to said second substrate material.

7. An apparatus for the production of thin films comprising a chamber, means for evacuating said chamber, a crucible in said chamber for containing a metal to be evaporated, a resistance furnace in said chamber for evaporating the metal from said crucible through an opening in the crucible, means for supporting and controlling the temperature of a substrate material in the chamber spaced from said crucible, means for introducing a chemically reactive gas into a region of said chamber spaced from said heating means and adjacent said substrate material, and a shielding means having an aperture therein associated with said crucible, said shielding means regulating contact of said gas and evaporated metal to prevent intermixture thereof prior to almost complete evaporation of the metal and said aperture not being substantially larger than said opening in the crucible.

8. An apparatus for the production of thin films of metal oxides comprising a chamber, means for evacuating said chamber, a crucible in said chamber for containing a metal to be evaporated, a resistance furnace in said chamber for evaporating the metal from said crucible through a diffusion aperture in the crucible, means for supporting and controlling the temperature of a substrate material in the chamber spaced from said crucible, means for introducing oxygen gas into a region of said chamber spaced from said heating means and adjacent said substrate material, and shielding means on said furnace for regulating contact of said gas and said vapor to promote intermixture thereof subsequent to almost complete evaporation of said metal, said shielding means including a horizontally disposed cylindrical member surrounding said crucible, said cylindrical member having an aperture therein corresponding to said crucible diffusion aperture, and means for introducing an inert gas into said cylindrical member.

9. An apparatus for the production of thin films of metal oxides comprising a chamber, means for evacuating said chamber, and in said chamber, a crucible for containing a metal to be evaporated, a resistance furnace for transforming said metal into a vapor, means for supporting and controlling the temperature of a substrate material spaced over said crucible, means to introduce oxygen gas into a region of said chamber spaced from said heating means and adjacent said substrate material, and a short tube projecting from the mouth of the crucible permitting substantial evaporation of said metal prior to contact and interaction with said gas.

10. An apparatus for the production of thin films comprising a chamber, means for evacuating said chamber, a crucible in said chamber for containing a metal to be evaporated, a resistance furnace in said chamber for heating said metal, means for supporting a substrate material in said chamber spaced from said crucible, means for introducing a chemically reactive gas into a region of said chamber spaced from said heating means and adjacent said substrate material and a cover on said crucible to permit substantial evaporation of said metal prior to contact and interaction with said gas, said cover having a small diffusion aperture therein through which the metal evaporates from said crucible.

References Cited in the file of this patent

UNITED STATES PATENTS

| | | |
|---|---|---|
| 1,398,770 | Clapp | Nov. 29, 1921 |
| 2,157,478 | Burkhardt et al. | May 9, 1939 |
| 2,318,011 | Parsons et al. | May 4, 1943 |
| 2,394,930 | McRae | Feb. 12, 1946 |
| 2,479,540 | Osterberg | Apr. 16, 1949 |
| 2,539,149 | Miller | Jan. 23, 1951 |
| 2,578,956 | Weinrich | Dec. 18, 1951 |
| 2,671,034 | Steinfeld | Mar. 2, 1954 |
| 2,684,918 | Oughton | July 27, 1954 |
| 2,770,523 | Toole | Nov. 13, 1956 |
| 2,784,115 | Brinsmaid et al. | Mar. 5, 1957 |
| 2,904,452 | Reichelt | Sept. 15, 1959 |

FOREIGN PATENTS

| | | |
|---|---|---|
| 519,584 | Germany | Mar. 2, 1931 |

OTHER REFERENCES

"Vacuum Deposition of Thin Films" (Holland), published by John Wiley and Sons (N.Y., N.Y.) (p. 474).